E. H. SNYDER.
NUT LOCK.
APPLICATION FILED JUNE 18, 1915.

1,188,364.

Patented June 20, 1916.

Inventor
Edwin H. Snyder

By
Ithiel J. Gilley
Attorney

UNITED STATES PATENT OFFICE.

EDWIN H. SNYDER, OF KENT CITY, MICHIGAN, ASSIGNOR OF ONE-HALF TO ROBERT WALMSLEY AND OSCAR RIVETTE, OF KENT CITY, MICHIGAN.

NUT-LOCK.

1,188,364.  Specification of Letters Patent.  Patented June 20, 1916.

Application filed June 18, 1915. Serial No. 34,949.

*To all whom it may concern:*

Be it known that I, EDWIN H. SNYDER, a citizen of the United States, residing at Kent City, in the county of Kent and State of Michigan, have invented certain new and useful Improvements in Nut-Locks, of which the following is a specification.

My invention relates to improvements in appliances for locking, or firmly securing nuts in place on bolts such as are used for securing the fish plates and rails together in railroad construction, or in any other place where it is essential or desirable to so lock a nut onto a bolt that it cannot be loosened by continual jar or friction of parts upon the bearing surface of the nut, and its object is to provide a lock for the purpose set forth that will be practically inexpensive, and will, at the same time so act upon the nut and bolt that the nut may be readily screwed upon the bolt, but cannot possibly be screwed back off of the bolt. I attain this object by the mechanism and arrangement of parts shown in the accompanying drawing, in which—

Figure 1:
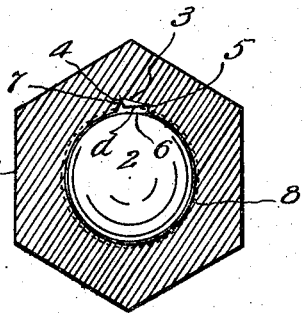
Figure 2:
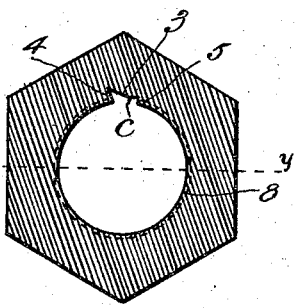
Figure 3:
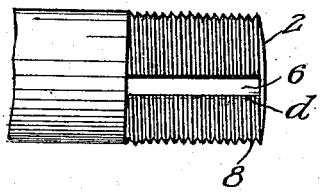
Figure 4:
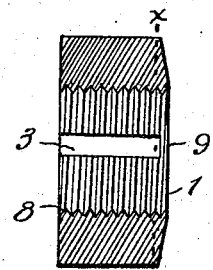
Figure 5:
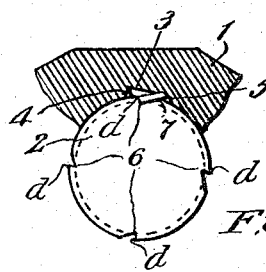
Figure 6:
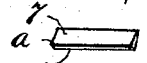

Figure 1 is a sectional elevation of the nut practically on the line $x$ $x$ of Fig. 4, looking to the left, and with the end of the bolt in place in the nut; Fig. 2 is the same with the bolt removed to more plainly show the form of the groove in the nut; Fig. 3 is a plan of the screw end of the bolt showing the position of the groove therein; Fig. 4 is a sectional view of the nut looking upward from the line $y$ $y$ of Fig. 2; Fig. 5 is an end view of the bolt with a sectional view of a segment of the nut thereon and showing the position of the key when the nut is locked in place; Fig. 6 is a perspective of the key detached from the bolt and nut.

Similar numerals refer to similar parts throughout the several views.

In the construction of this nut lock I make use of ordinary bolts and nuts, but form a narrow, shallow groove 3 in the nut 1, said groove being made practically of the form shown in Fig. 2, the back end of the grooves at 4, being deeper than the front end, at 5, and the bottom of the groove being formed with a slight offset or ridge, as indicated at $c$, so that if the nut is being turned to the right (if a right hand screw) the key 7 will be forced back against the inclined end 4 of the groove, as indicated in Fig. 1, and the nut may be easily screwed back upon the bolt 2. The bolt 2 is, also provided with a shallow groove 6, so located and formed that when the nut is being turned to the right the key 7 will pass it without engaging said groove, or in any way interfering with the movement of the nut, but if the nut is turned backward, or over to the left, as soon as the key, carried in the back part of the groove as hereinbefore described, passes the groove 6 the back edge of the key will drop into the groove 6 and the front edge will be forced upward, or outward into the bearing 5 of the groove 3 and the back edge, $a$, $b$, will be forced against the shoulder $d$ in the bolt and the position of the key will absolutely lock the nut in place so rigidly that it will be impossible to turn the nut backward to screw it off of the bolt.

The object in not making the groove 3 entirely through from surface to surface of the nut is to form a shoulder 9 in the nut that will prevent the key from falling out of its seats at any time, and at the same time prevent anyone from in any way tampering with the key to unlock the nut after it has been locked in place.

It will be readily understood that several grooves 6 may be made in the sides of the bolt, as indicated in Fig. 5 so the nut may be locked in any desired position by turning it but the fraction of a revolution, thus averting the danger of the nut being jarred or worked slightly backward and the key loosened, and at the same time so gaging the movement of the nut that when the key is forced into the groove or either of the grooves 6 in the bolt it will be held absolutely firm in place, while if a great distance existed between grooves 6 it might be impossible at times to carry the key around to engagement with them or any of them, and thus leave the nut liable to be jarred loose and the bolt and nut to lose their firm bearings in the parts that are bolted together, thus, perhaps causing bad rattling of the parts, or a weak and unsatisfactory connection of the parts.

The end 4 of the groove 3 and the end $d$ of the groove 6 should be inclined at an acute angle from the surfaces of the nut and bolt so that when the edge of the key is in contact therewith it will not be inclined to slide out of the groove, and the point $b$ of the key should project slightly farther outward than the point a so as to insure the throwing of the point of the key so that the said point or edge of the key will be thrown upward into the depression between the angle c and the shoulder 5 when the nut is turned backward to positively insure the firm locking of the nut. The groove 3 should be enough deeper than the valleys between the screw threads in the nut so the key 7 may be lodged therein and move freely over the apices of the screw threads on the bolt and allow the nut to be turned forward freely when screwing it onto the bolt, in which case the backward incline of the shoulder 4 holds the key from dropping into the grooves 6 in the shaft so long as the nut is being screwed onto the bolt, but so that the moment the nut is turned backward to unscrew it off from the bolt the key will drop into the groove, or one of the grooves 6 in the bolt, and the point of the key will be thrown up against the shoulder 5, as and with the effect hereinbefore stated.

What I claim as new, and desire to secure by Letters Patent of the United States, is:

1. In a nut lock, a nut having a groove deep at one edge and tapering down shallow at the other edge the groove being somewhat deeper than the valleys between the screw teeth and the bed of the groove forming a slight obtuse angle near the shallow end, a shoulder formed on the nut at the outer end of the groove; a bolt having a groove through the threaded part, said groove being deep at one edge and terminating at the apices of the screw threads at the other edge, a key made thick at one edge and thin at the other edge and made to fit in the groove in the bolt and arranged to allow the nut to be screwed on freely but to lock it from being screwed off of the bolt, substantially as shown and described.

2. In a nut lock, a nut having a groove in its inner surface that is deeper at one edge than at the other and deeper at both edges than the valleys between the screw threads, and the wall at one edge of the groove inclined to an acute angle with the surface of the nut, a ridge formed longitudinally in the bed of the groove, a bolt with a slot in its threaded part deep at one edge and inclining to the apices of the screw teeth at the other edge, a key fitted into said grooves in such a manner as to allow the nut to be screwed onto the bolt freely but to lock the bolt from being unscrewed from the bolt, and means for preventing the key from being removed from the grooves endwise, substantially as shown and described.

Signed at Kent City, Michigan, June 14, 1915.

EDWIN H. SNYDER.

Copies of this patent may be obtained for five cents each, by addressing the "Commissioner of Patents, Washington, D. C."